US012790987B2

(12) United States Patent
Herring

(10) Patent No.: US 12,790,987 B2
(45) Date of Patent: Nov. 10, 2026

(54) VARIABLE TRANSMISSION DRIVEN FUEL PUMP FOR A GAS TURBINE ENGINE

(71) Applicant: RTX CORPORATION, Farmington, CT (US)

(72) Inventor: Neal R. Herring, East Hampton, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/081,228

(22) Filed: Mar. 17, 2025

(65) Prior Publication Data

US 2025/0270962 A1 Aug. 28, 2025

Related U.S. Application Data

(62) Division of application No. 16/803,110, filed on Feb. 27, 2020, now Pat. No. 12,276,230.

(60) Provisional application No. 62/821,032, filed on Mar. 20, 2019.

(51) Int. Cl.

| | |
|---|---|
| ***F02C 7/236*** | (2006.01) |
| ***F02C 7/224*** | (2006.01) |
| ***F02C 9/30*** | (2006.01) |
| ***F02K 3/04*** | (2006.01) |
| ***F16H 9/12*** | (2006.01) |

(52) U.S. Cl.

CPC ................ *F02C 9/30* (2013.01); *F02C 7/224* (2013.01); *F02C 7/236* (2013.01); *F02K 3/04* (2013.01); *F16H 9/12* (2013.01)

(58) Field of Classification Search

CPC .................................. F02C 7/32; F02C 7/236

See application file for complete search history.

(56) References Cited

U.S. PATENT DOCUMENTS

| | | | | |
|---|---|---|---|---|
| 3,596,467 | A * | 8/1971 | Avery | F04D 15/0066 476/4 |
| 7,260,926 | B2 * | 8/2007 | Sabatino | F02C 7/22 60/206 |
| 2002/0002089 | A1 * | 1/2002 | Van Spijk | F16H 57/029 474/69 |
| 2005/0153805 | A1 * | 7/2005 | Koyama | F16H 61/66272 474/18 |
| 2007/0232423 | A1 * | 10/2007 | Katou | F16H 61/66272 474/18 |
| 2008/0047376 | A1 * | 2/2008 | Venter | F02C 7/36 74/15.2 |
| 2016/0369746 | A1 * | 12/2016 | Armstrong | F01K 23/10 |
| 2020/0340411 | A1 * | 10/2020 | Carpenter | F02C 7/236 |

FOREIGN PATENT DOCUMENTS

| | | | | |
|---|---|---|---|---|
| FR | 3142223 | A1 * | 5/2024 | F02C 7/36 |

* cited by examiner

*Primary Examiner* — Gerald L Sung

(74) *Attorney, Agent, or Firm* — Carlson, Gaskey & Olds, P.C.

(57) ABSTRACT

A fuel system for a gas turbine engine includes a fuel pump to provide fuel flow during engine operation and a transmission system that includes an output shaft coupled to drive the fuel pump, and an input shaft driven through a mechanical link to a shaft of the gas turbine engine. The output shaft drives the fuel pump at a variable speed that is independent of a rotational speed of the input shaft.

9 Claims, 5 Drawing Sheets

VARIABLE TRANSMISSION DRIVEN FUEL PUMP FOR A GAS TURBINE ENGINE

CROSS-REFERENCE TO RELATED APPLICATIONS

This application is a Divisional of U.S. patent application Ser. No. 16/803,110 filed on Feb. 27, 2020, which claims priority to U.S. Provisional Application No. 62/821,032 which was filed on Mar. 20, 2019.

BACKGROUND

A gas turbine engine typically includes a fan section, a compressor section, a combustor section, and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Fuel supplied to the combustor is provided by a mechanical pump driven by a rotating shaft of the engine. The mechanical pump is reliable and supplies fuel in proportion to engine speed. The minimum capacity of the mechanical pump is sized such that sufficient fuel is provided for high power conditions and/or engine starting. Excess fuel not needed is recirculated within the fuel system or back to the fuel tank. The fuel is further utilized as a coolant for other systems of the engine. Recirculation of fuel increases the temperature of the fuel and thereby reduces the available capacity to absorb heat from other systems. The capacity of the fuel to absorb heat from other systems is further limited by the characteristics of the fuel. At a certain temperature, the fuel begins to degrade and create deposits in the fuel system that can degrade engine performance. Reducing the amount of fuel that is recirculated during engine operation may improve the capacity of the fuel to absorb heat from other systems.

Turbine engine manufacturers continuously seek improvements to engine performance including improvements to thermal, transfer and propulsive efficiencies.

SUMMARY

A fuel system for a gas turbine engine according to an exemplary embodiment of this disclosure includes, among other possible things, a fuel pump to provide fuel flow during engine operation, and a transmission system that includes an output shaft coupled to drive the fuel pump, and an input shaft driven through a mechanical link to a shaft of the gas turbine engine. The output shaft drives the fuel pump at a variable speed that is independent of a rotational speed of the input shaft.

In a further embodiment of the foregoing fuel system for a gas turbine engine, the transmission system comprises a hydraulic drive driven by the mechanical link.

In another embodiment of any of the foregoing fuel systems for a gas turbine engine, the output shaft is coupled to the hydraulic drive. A hydraulic control valve controls the hydraulic fluid flow to the hydraulic drive for controlling a speed of the output shaft.

In another embodiment of any of the foregoing fuel systems for a gas turbine engine, the hydraulic drive comprises a constant speed drive.

In another embodiment of any of the foregoing fuel systems for a gas turbine engine, the transmission comprises a continuously variable transmission with first shaft coupled to the input shaft. A second shaft is coupled to the output shaft and a flexible link coupling the first shaft to the second shaft.

In another embodiment of any of the foregoing fuel systems for a gas turbine engine, the first shaft includes a primary pulley and the second shaft includes a secondary pulley with the flexible link disposed between the primary pulley and the secondary pulley. Each of the primary pulley and the secondary pulley include halves split relative to the axis of rotation and the flexible link comprises a V-shape in cross-section. A distance between the halves of each of the primary pulley and the secondary pulley is variable to change a drive ratio between input shaft and the output shaft.

In another embodiment of any of the foregoing fuel systems for a gas turbine engine, the variable speed of the output shaft is controlled responsive to a fuel flow demand of the gas turbine engine.

In another embodiment of any of the foregoing fuel systems for a gas turbine engine, the transmission system comprises a variable drive that is controlled to provide a speed of the output shaft independent of the speed of the input shaft.

In another embodiment of any of the foregoing fuel systems for a gas turbine engine, a heat exchanger is included for transferring heat into a fuel flow generated by the fuel pump.

A gas turbine engine according to an exemplary embodiment of this disclosure includes, among other possible things, a fan rotatable within a fan nacelle and a core engine that includes a compressor communicating compressed air to a combustor where compressed air is mixed with fuel and ignited to generate a high-energy gas flow expanded through a turbine. A fuel system includes a fuel pump to provide fuel flow during engine operation and a transmission system that includes an output shaft coupled to drive the fuel pump and an input shaft driven through a mechanical link to a shaft of the gas turbine engine. The output shaft drives the fuel pump at a variable speed that is independent of a rotational speed of the input shaft.

In a further embodiment of the foregoing gas turbine engine, the transmission system comprises a hydraulic drive driven by the mechanical link.

In another embodiment of any of the foregoing gas turbine engines, the output shaft is coupled to the hydraulic drive and a hydraulic control valve controls the hydraulic fluid flow to the hydraulic drive for controlling a speed of the output shaft.

In another embodiment of any of the foregoing gas turbine engines, the hydraulic drive comprises a constant speed drive.

In another embodiment of any of the foregoing gas turbine engines, the transmission comprises a continuously variable transmission with a first shaft coupled to the input shaft. A second shaft is coupled to the output shaft and a flexible link coupling the first shaft to the second shaft.

In another embodiment of any of the foregoing gas turbine engines, the first shaft includes a primary pulley and the second shaft includes a secondary pulley with the flexible link disposed between the primary pulley and the secondary pulley. Each of the primary pulley and the secondary pulley include halves split relative to the axis of rotation and the flexible link comprises a V-shape in cross-section. A distance between the halves of each of the primary pulley and the secondary pulley is variable to change a drive ratio between input shaft and the output shaft.

In another embodiment of any of the foregoing gas turbine engines, the transmission system comprises a variable drive that is controlled to provide a speed of the output shaft independent of the speed of the input shaft. The variable speed of the output shaft is controlled responsive to a fuel flow demand of the gas turbine engine.

In another embodiment of any of the foregoing gas turbine engines, a heat exchanger is included for transferring heat into a fuel flow generated by the fuel pump.

A method of supplying fuel to a combustor of a gas turbine engine according to an exemplary embodiment of this disclosure includes, among other possible things, driving an input shaft of a transmission system with a mechanical link to a shaft of the gas turbine engine at a varying input speed. A fuel pump is driven with an output shaft of the transmission system at a varying output speed that is independent of the varying input speed. The varying output speed drives the fuel pump at a speed that provides fuel flow corresponding with an operating condition of the engine determined to minimize excess fuel flow.

In a further embodiment of the foregoing method of supplying fuel to a combustor of a gas turbine engine, the transmission system comprises a hydraulic drive powered by a hydraulic fluid flow from a hydraulic pump. The hydraulic pump is driven by the mechanical link. The output shaft is coupled to the hydraulic drive and a hydraulic control valve controls the hydraulic fluid flow to the hydraulic drive for controlling the varying output speed.

In another embodiment of any of the foregoing methods of supplying fuel to a combustor of a gas turbine engine, the transmission comprises a continuously variable transmission with first shaft coupled to the input shaft. A second shaft is coupled to the output shaft and a flexible link coupling the first shaft to the second shaft. The first shaft includes a primary pulley and the second shaft includes a secondary pulley with the flexible link disposed between the primary pulley and the secondary pulley. Each of the primary pulley and the secondary pulley include halves split relative to the axis of rotation and the flexible link comprises a V-shape in cross-section, and a distance between the halves of each of the primary pulley and the secondary pulley is variable to change a drive ratio between input shaft and the output shaft.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
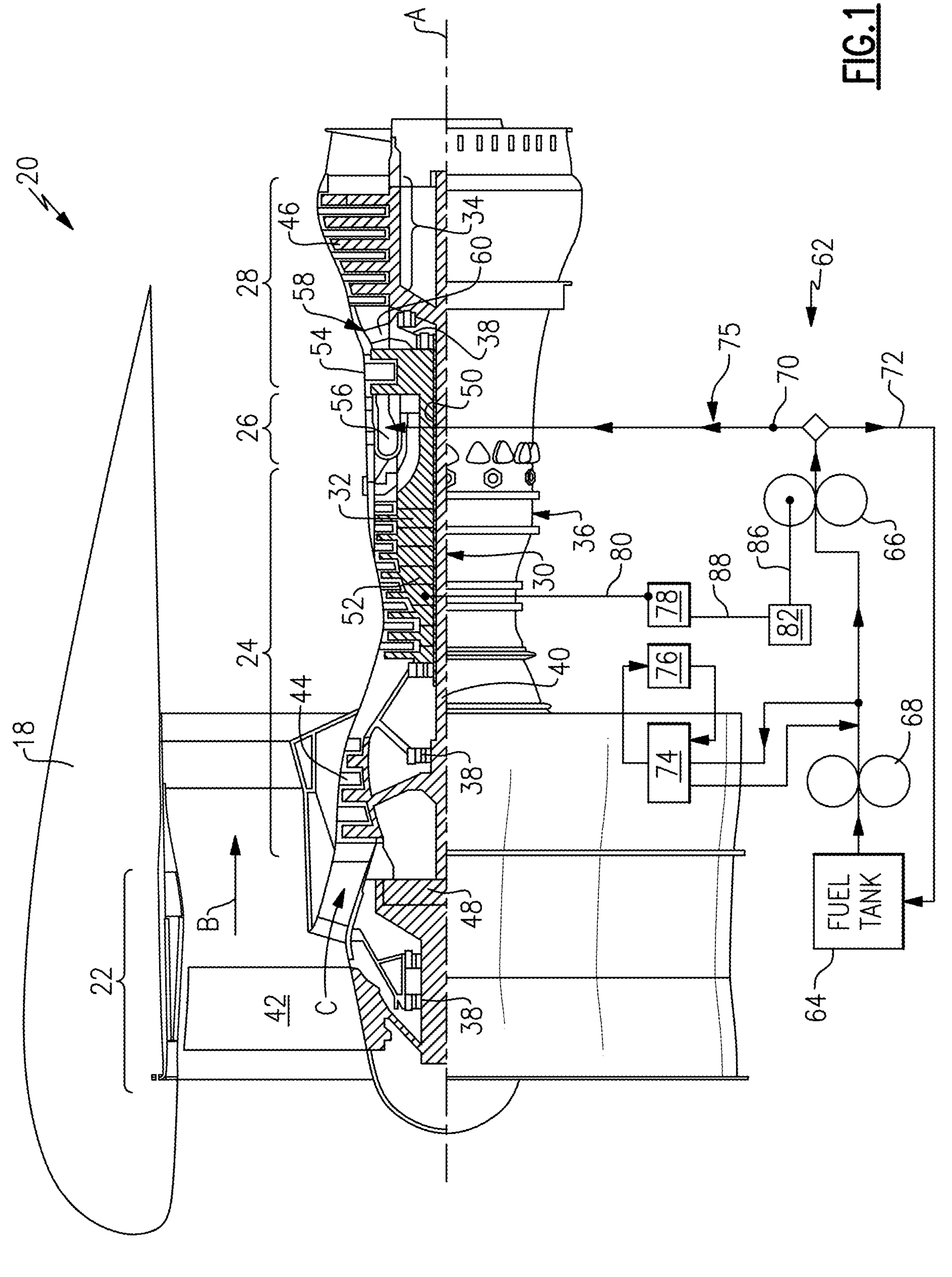
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram®})/(518.7°\text{ R})]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Fuel is delivered to the combustor 56 by a fuel system 62. The example fuel system 62 includes a main fuel pump 66 and a boost fuel pump 68. The boost pump 68 pumps fuel from a fuel tank 64 and communicates the fuel to the main pump 66. The main pump 66 increases a pressure of the fuel flow to a pressure suitable for communication to the combustor 56. The disclosed fuel system 62 tailors a flow of fuel 75 to the combustor 56 based on engine operating conditions. Instead of simply providing a fuel flow that provides for extremes of operating demands, the disclosed fuel system 62 varies the flow of fuel 75 according to a demand for fuel. By tailoring the flow of fuel through the main fuel pump 66 to engine operating demand, excess fuel flow through a fuel recirculation loop 72 can be reduced and/or eliminated.

Fuel is utilized as a heat sink to cool other flows within the engine such as lubricant and air flows. In this example, a heat fuel/oil heat exchanger 74 cools a flow of lubricant generated by a lubricant system 76. Recirculation of fuel results in an increased temperature of the fuel and thereby a reduced capability to accept heat from other engine systems, such as the example lubricant system 76.

The disclosed fuel system 62 includes utilizes a transmission system 82 that receives a varying input through a shaft 88 or other mechanical link one of the inner and outer shafts 40, 50 of the engine 20. In one disclosed example, an accessory gearbox 78 is driven by a tower shaft 80 coupled to the outer shaft 50. The accessory gearbox 78 drives the shaft 88 that drives the transmission system 82. The transmission system 82 drives an output shaft 86 coupled to drive the main pump 66. The transmission system 82 produces a variable speed output through the shaft 86 to tailor operation of the main pump 66. The input shaft 88 varies with a speed of the outer shaft 50. The transmission system 82 provides an output speed through the output shaft 86 that varies independent of the input speed of the input shaft 88. Accordingly, regardless of the input speed provided by the input shaft 88, the output speed 86 is tailored to operate the main fuel pump 66 to provide the fuel flow 75 to the combustor 56 to more closely match a demand for fuel such that excess flow through a recirculation passage 72 is reduced and/or eliminated. Varying the flow of fuel 75 based on demand to reduce and/or eliminate the recirculation of fuel enables an increase the ability of the fuel to accept heat from other engine systems.

Figure 2:
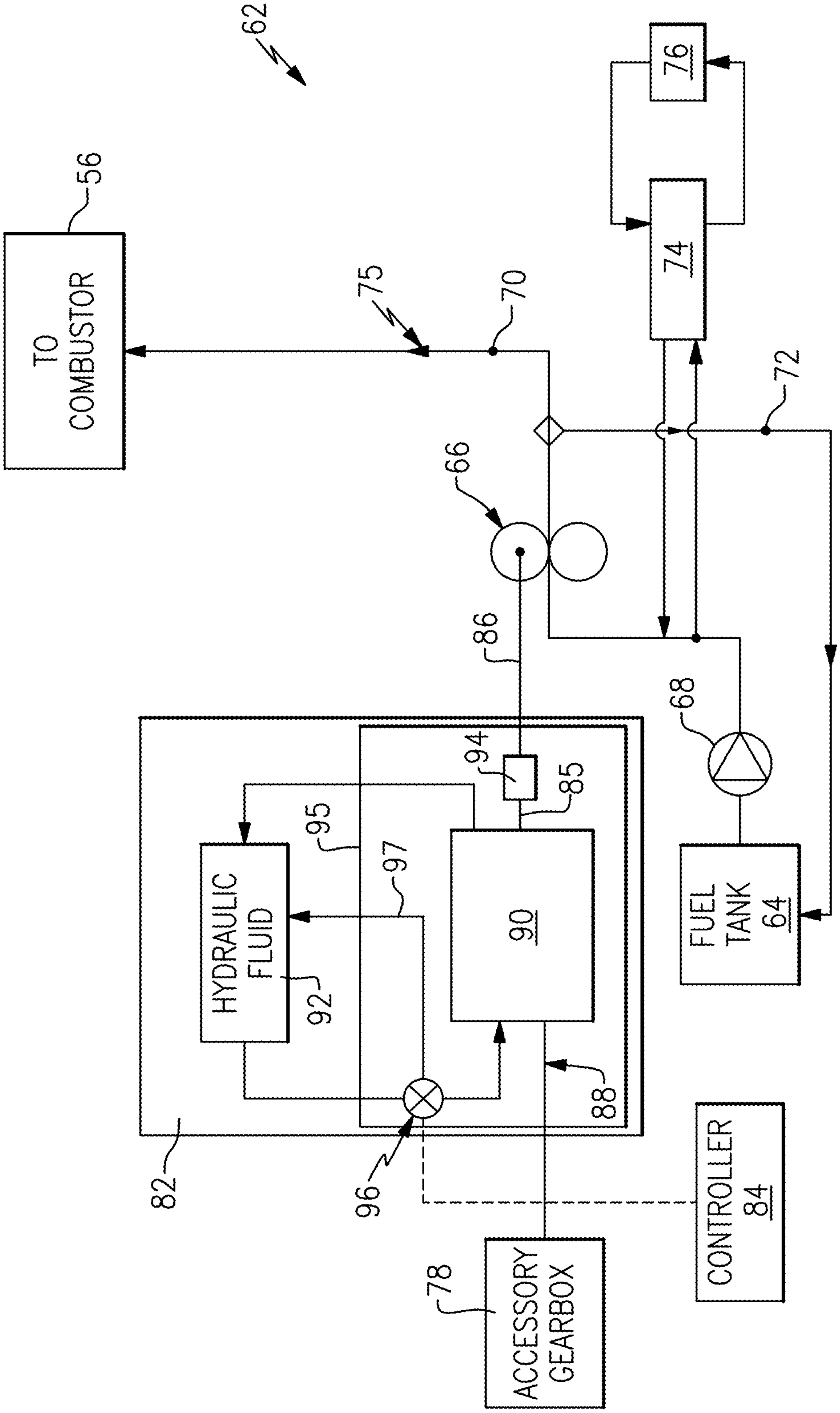
FIG. 2 is a schematic view of an example fuel system embodiment.

Referring to FIG. 2, with continued reference to FIG. 1, the transmission system 82 in one disclosed example embodiment comprises a hydraulic drive 90 driven by the input shaft 88 to provide an output through a gear system 95. The accessory gearbox 78 drives the hydraulic drive 90 through the input shaft 88. The hydraulic drive 90 utilizes hydraulic fluid to drive an output shaft 85 that drives a gear system 94. Control of fluid flow through the hydraulic drive 90 controls a speed of the output shaft 85 relative to the speed of the input shaft 88. A hydraulic fluid reservoir 92 provides hydraulic fluid to the hydraulic drive 94. The disclosed hydraulic drive 90 is a pump that may be a dedicated system for driving the main fuel pump 66 or may be part of a hydraulic fluid system utilized to power other devices and actuators of the engine and aircraft.

The example hydraulic drive 90 is supplied hydraulic fluid from the reservoir 92 during operation. The relationship between the speed of the input shaft 88 and the speed of the output shaft 85 is varied by control of the flow of hydraulic fluid through the drive 90. In one disclosed example, a hydraulic control valve 96 is provided that governs the flow of hydraulic fluid to the drive 90. Depending on the desired speed of the output shaft 85, the control valve 96 will communicate fluid to the drive 90. An increase in hydraulic fluid flow will provide an increase of the speed of the output shaft 85 relative to the speed of the input shaft 88. A decrease in hydraulic fluid flow provides a decrease in the speed of the output shaft 85 relative to the speed of the input shaft 88. Excess hydraulic fluid flow is routed back to the reservoir 92 through a bypass passage 97.

The accessory gearbox 78 may provide a varying input speed through the input shaft 88. The hydraulic drive 90 provides an output that also varies based on the needs of the fuel pump 66. The disclosed hydraulic drive 90 is driven at a variable speed through the input shaft 88. In the disclosed example, the control valve 96 is controlled by a controller 84 to control hydraulic fluid flow to the drive 90 to control the output speed of the output shaft 85. The output shaft 85 drives the gear system 85 that in turn drive the shaft 86 that drives the fuel pump 66. The example control valve 96 is a proportional valve that proportionally controls fluid flow to the drive 90 as required to provide the desired output speed of the output shaft 85. The speed of the output shaft 85 therefore may be controlled independent of the input speed of the input shaft 88.

It should be appreciated that although the example control valve 96 is controlled by a controller 84, the control valve 96 may be a mechanically actuated valve that proportions fluid flow to the drive 90 to provide a fixed output speed through the output shaft 85. When a mechanical control valve is utilized, excess flow is directed through the bypass passage 97 based on the input speed of the input shaft 88 to provide the desired output speed.

The disclosed hydraulic drive 90 may be part of an integrated drive system provided in a common housing, schematically indicated at 95. The hydraulic drive 90 may comprise a constant speed drive capable of providing an output speed that is fixed or that varies independent of a speed of an input shaft. It should be appreciated, that although a specific hydraulically driven transmission is disclosed by way of example, other hydraulic systems capable of providing a tailored output speed to drive the main fuel pump 66 are within the contemplation and scope of this disclosure.

Figure 3:
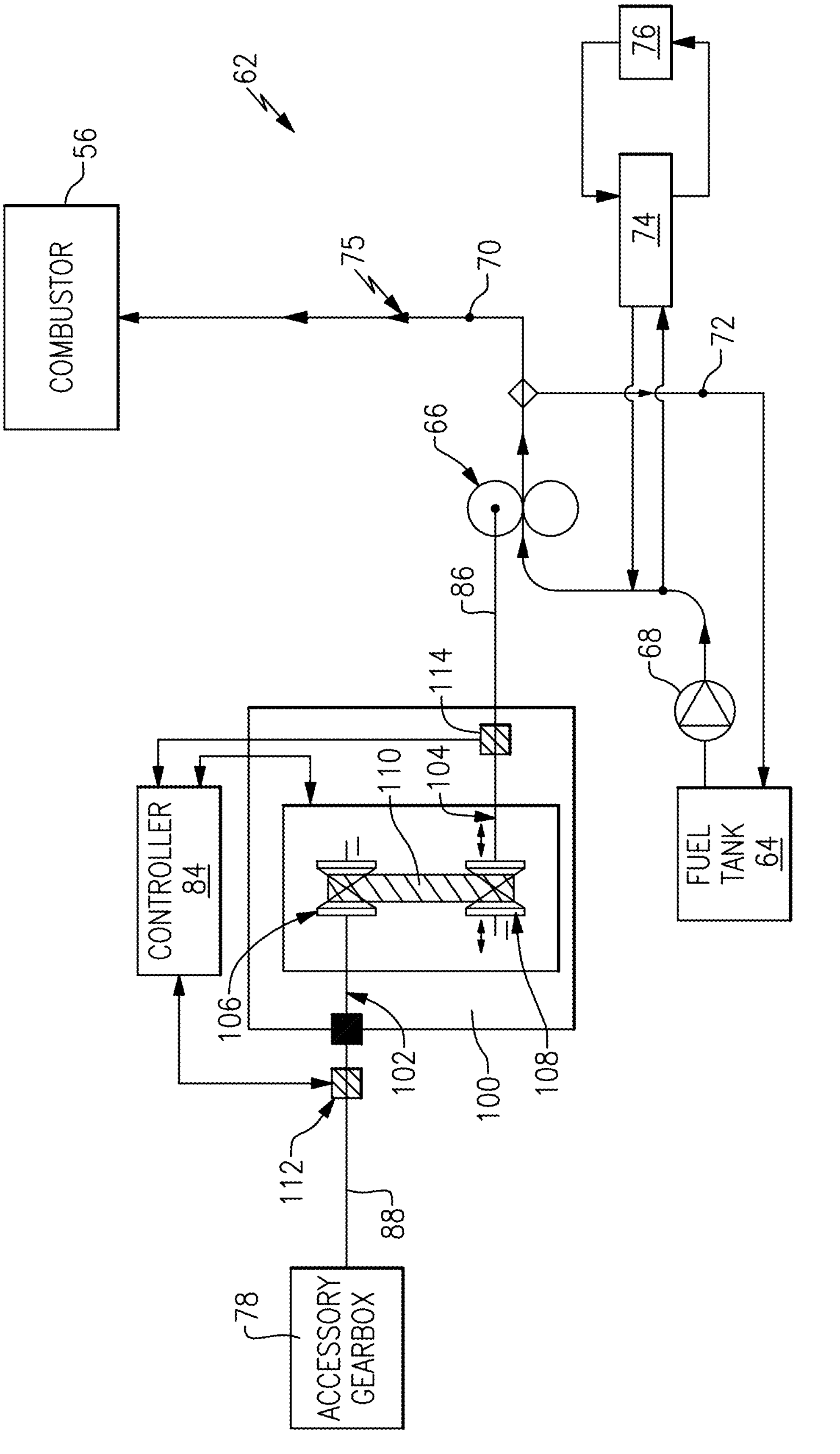
FIG. 3 is a schematic view of another example fuel system embodiment.

Referring to FIG. 3 with continued reference to FIG. 1, the example fuel system 62 is driven by a continuously variable transmission 100 with a first shaft 102 coupled to the input shaft 88 and a second shaft 14 coupled to drive the output shaft 86 and a flexible link 110 coupling the first shaft 102 to the second shaft 14. The example variable transmission 100 is continuously variable transmission that uses split pulleys on each of the first and second shafts to adjust a speed ratio between the first and second shafts 102, 104.

The first shaft 106 includes a first pulley 106 and the second shaft 104 includes a second pulley 18. The flexible link 110 is a V-shaped belt disposed between the first and second pulleys 106, 108. The first and second pulleys 106, 108 include radially ramped surfaces that expand and contract depending on a rotational speed. The V-shaped belt 110 transmits rotational torque and speed between the shafts at relative speed that are based on a varying radial location on each of the first and second pulleys 106,108.

Figure 5:
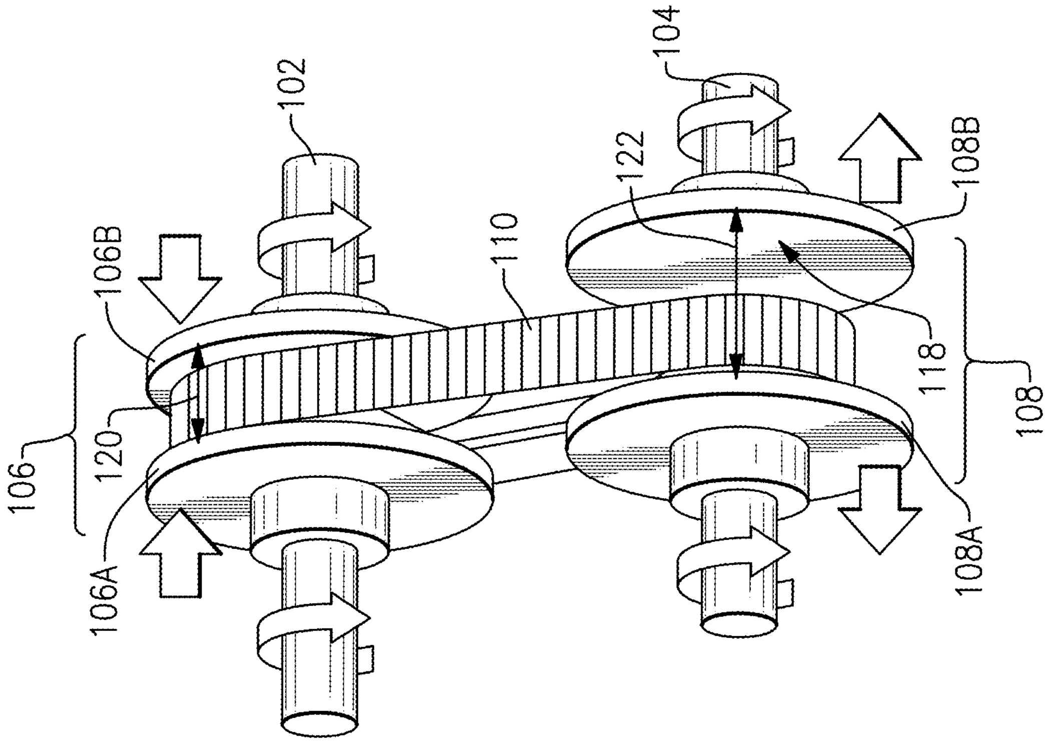
FIG. 5 is a schematic view of the example drive system embodiment in a second operating condition.
Figure 4:
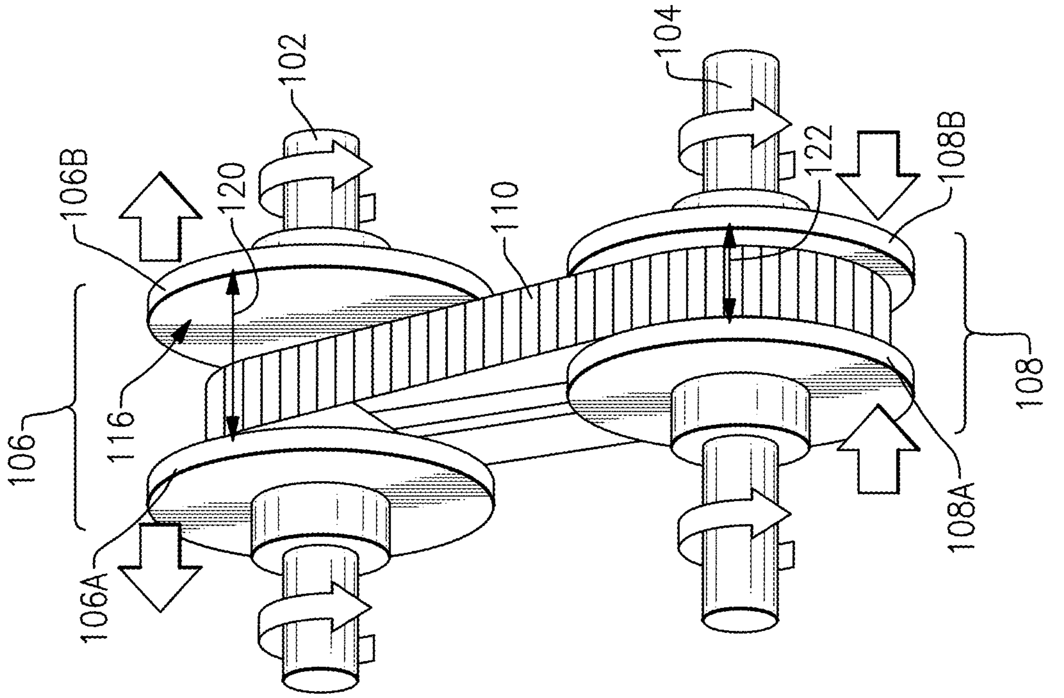
FIG. 4 is a schematic view of an example drive system embodiment in a first operating condition.

Referring to FIGS. 4 and 5 with continued reference to FIGS. 1 and 3, in this disclosed example, primary pulley and the secondary pulley include halves split relative to the axis of rotation and the flexible link comprises a belt 110 having a V-shape in cross-section. The first pulley 106 include a first half 106A and a second half 106B that are spaced axially apart by a distance 120. The second pulley 108 includes a first half 108A and a second half 108B that are spaced an axial distance 122 apart.

An inner surface 116 of the first pulley 106 and an inner surface 118 of the second pulley 108 are ramped such that the belt 110 will ride on each of the pulleys 106, 108 at different radial positions depending on the corresponding axial distance 120, 122. The axial distance 120, 122 between halves of each pulley 106, 108 will vary depending on a speed of the corresponding shaft 102, 104 to provide a continuously varying speed ratio. The speed ratio between the first shaft 102 and the second shaft 104 may thereby provide a variable output speed to the main fuel pump 66 by adjusting the axial spacing 120, 122 for each of the first and second pulleys 106, 108.

The axial spacing 120, 122 can be arranged to automatically adjust to provide a defined output speed of the output shaft 86 to the main fuel pump 66. The axial spacing 120, 122 may also be controlled by the controller 84 based on sensed conditions. In one disclosed example embodiment, the controller 84 receives rotational speed information from a first sensor 112 sensing a speed of the first shaft 102 and a second sensor 114 sensing a speed of a second shaft 104. The controller 84 uses the different speed information to adjust the transmission 100 to provide a desired output speed to drive the main fuel pump 66. The controller 84 adjusts the speed reduction ratio based on sensed or otherwise determined engine operating conditions. Based on the specific engine operating condition, the controller 84 adjusts the transmission 100 to provide a speed at the output shaft 86 that is determined to tailor the fuel flow generated by the main fuel pump 66 to match the demand for fuel of the gas turbine engine.

Figure 6:
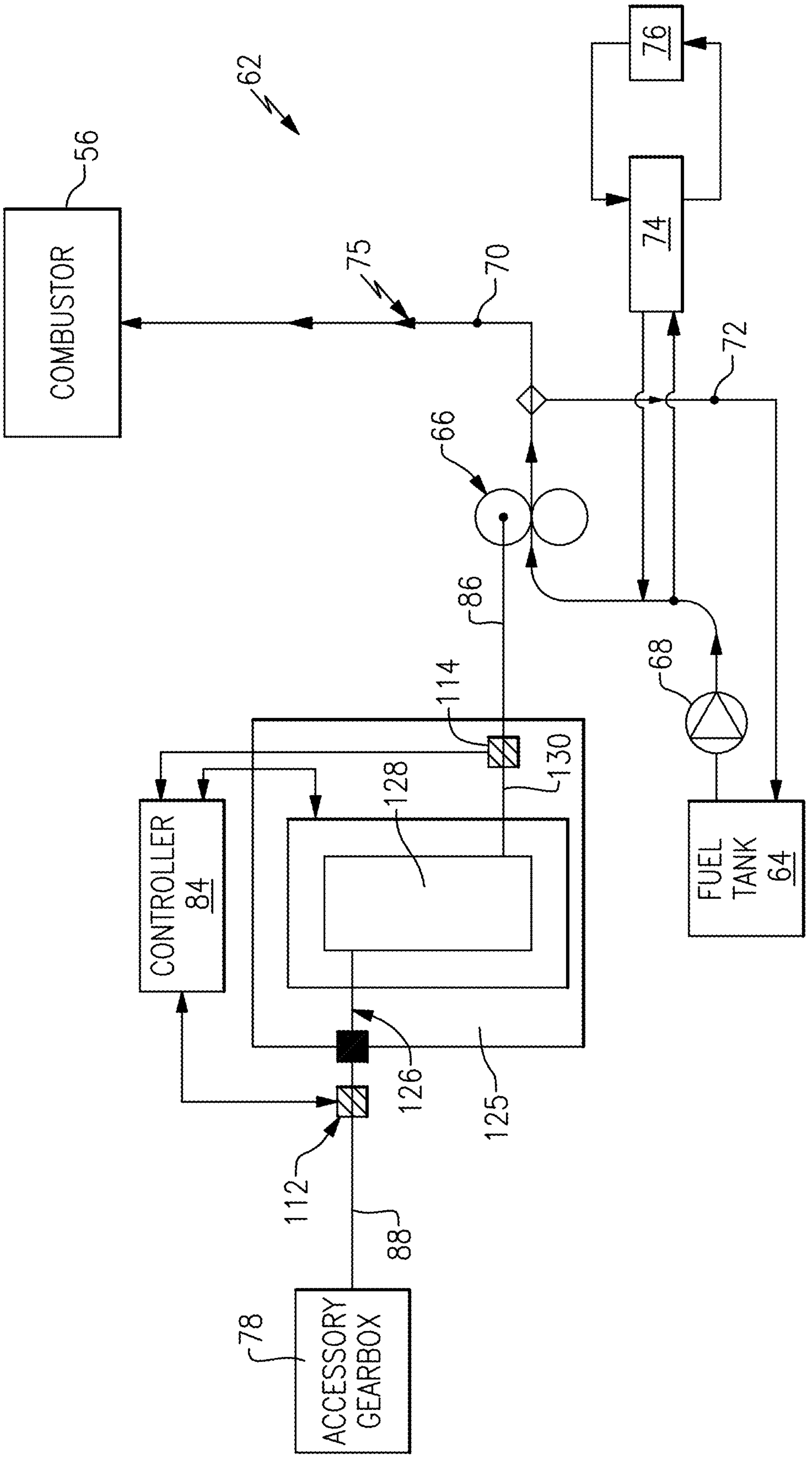
FIG. 6 is a schematic view of another example fuel system embodiment.

Referring to FIG. 6 with continued reference to FIG. 1, the example fuel system 62 is schematically shown and is driven by a continuously variable transmission 125 that includes a variable drive 128 that provides an output speed of an output shaft 130 that varies relative to an input speed of the input shaft 88 driven by the accessory gearbox 78. The speed sensors 112 and 114 provide information to the controller 84 indicative of current speeds of the corresponding input shaft 88 and output shaft 140. The example variable drive 128 can be controlled to provide a speed of the output shaft 130 independent of the speed of the input shaft 88. The variable drive may also be controlled to provide a speed of the output shaft 130 that proportional to the speed of the input shaft 88.

In one example embodiment, the controller 84 controls the variable drive 128 to drive the output shaft 130 at a speed independent of the speed of the input shaft 88. The controller 84 adjusts the variable drive to provide a desired speed of the fuel pump 66 based on fuel demand during engine operation. The variable drive 128 may be of any configuration that enables control of an output speed of an output shaft independent of or in proportion to an input speed of an input shaft. In one disclosed embodiment, the variable drive 128 is a toroidal continuously variable transmission that utilizes rollers between discs to transit power. It should be appreciated that although several continuously variable transmission systems have been disclosed by way of example, any transmission system that enables control on an output speed of an output shaft independent of the speed of an input shaft could be utilized to drive the fuel pump 66 and are within the contemplation and scope of this disclosure.

Accordingly, the disclosed fuel systems provide a varied flow to match engine demand during operation that enables an increased heat acceptance capacity of the fuel while maintaining operation with a secondary drive system to assure uninterrupted fuel flow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel system for a gas turbine engine comprising:

a fuel pump providing fuel flow during engine operation; and a transmission system including an output shaft coupled to drive the fuel pump and an input shaft driven through a mechanical link to a shaft of the gas turbine engine, wherein the output shaft drives the fuel pump at a variable speed that is independent of a rotational speed of the input shaft, wherein the variable speed of the output shaft is controlled responsive to a fuel flow demand of the gas turbine engine such that excess fuel flow through a fuel recirculation loop is reduced or eliminated, thereby increasing the heat acceptance capacity of the fuel and the transmission system comprises a continuously variable transmission with a first shaft coupled to the input shaft, a second shaft coupled to the output shaft and a flexible link coupling the first shaft to the second shaft, wherein the first shaft is disposed on a first axis and the second axis is disposed on a second axis that is parallel and offset from the first axis.

2. The fuel system as recited in claim 1, wherein the first shaft includes a primary pulley and the second shaft includes a secondary pulley with the flexible link disposed between the primary pulley and the secondary pulley, wherein each of the primary pulley and the secondary pulley include halves split relative to the axis of rotation and the flexible link comprises a V-shape in cross-section, wherein a distance between the halves of each of the primary pulley and the secondary pulley is variable to change a drive ratio between input shaft and the output shaft.

3. The fuel system as recited in claim 1, wherein the variable speed of the output shaft is controlled responsive to a fuel flow demand of the gas turbine engine.

4. The fuel system as recited in claim 1, including a heat exchanger for transferring heat into a fuel flow generated by the fuel pump.

5. A gas turbine engine comprising:

a fan rotatable within a fan nacelle;

a core engine including a compressor communicating compressed air to a combustor where compressed air is mixed with fuel and ignited to generate a high-energy gas flow expanded through a turbine; and a fuel system including:

a fuel pump providing fuel flow during engine operation; and a transmission system including an output shaft coupled to drive the fuel pump and an input shaft driven through a mechanical link to a shaft of the gas turbine engine, wherein the output shaft drives the fuel pump at a variable speed that is independent of a rotational speed of the input shaft, wherein the variable speed of the output shaft is controlled responsive to a fuel flow demand of the gas turbine engine such that excess fuel flow through a fuel recirculation loop is reduced or eliminated, thereby increasing the heat acceptance capacity of the fuel, wherein the transmission system comprises a continuously variable transmission with a first shaft coupled to the input shaft, a second shaft coupled to the output shaft and a flexible link coupling the first shaft to the second shaft, wherein the first shaft is disposed on a first axis and the second shaft is disposed on a second axis that is parallel and offset from the first axis.

6. The gas turbine engine as recited in claim 5, wherein the first shaft includes a primary pulley and the second shaft includes a secondary pulley with the flexible link disposed between the primary pulley and the secondary pulley, wherein each of the primary pulley and the secondary pulley include halves split relative to the axis of rotation and the flexible link comprises a V-shape in cross-section, wherein a distance between the halves of each of the primary pulley and the secondary pulley is variable to change a drive ratio between input shaft and the output shaft.

7. The gas turbine engine as recited in claim 5, including a heat exchanger for transferring heat into a fuel flow generated by the fuel pump.

8. A method of supplying fuel to a combustor of a gas turbine engine comprising: a fuel system for the gas turbine engine comprising: a fuel pump providing fuel flow during engine operation; and a transmission system including an output shaft coupled to drive the fuel pump and an input shaft driven through a mechanical link to a shaft of the gas turbine engine, wherein the output shaft drives the fuel pump at a variable speed that is independent of a rotational speed of the input shaft, wherein the variable speed of the output shaft is controlled responsive to a fuel flow demand of the gas turbine engine such that excess fuel flow through a fuel recirculation loop is reduced or eliminated, thereby increasing the heat acceptance capacity of the fuel and the transmission system comprises a continuously variable transmission with a first shaft coupled to the input shaft, a second shaft coupled to the output shaft and a flexible link coupling the first shaft to the second shaft, wherein the first shaft is disposed on a first axis and the second axis is disposed on a second axis that is parallel and offset from the first axis, the method further comprising: driving the input shaft of the transmission system with the mechanical link to the shaft of the gas turbine engine at a varying input speed; driving the fuel pump with the output shaft of the transmission system at a varying output speed that is independent of the varying input speed, wherein the varying output speed drives the fuel pump at a speed that provides a fuel flow corresponding with an operating condition of the gas turbine engine determined to minimize the excess fuel flow.

9. The method as recited in claim 8, wherein the first shaft includes a primary pulley and the second shaft includes a secondary pulley with the flexible link disposed between the primary pulley and the secondary pulley, wherein each of the primary pulley and the secondary pulley include halves split relative to a respective axis of rotation and the flexible link comprises a V-shape in cross section, and a distance between the halves of each of the primary pulley and the secondary pulley is variable to change a drive ratio between the input shaft and the output shaft.

* * * * *